United States Patent [19]

Toews et al.

[11] Patent Number: 4,790,800
[45] Date of Patent: Dec. 13, 1988

[54] BELT TIGHTENING ASSEMBLY

[75] Inventors: Donovan E. Toews, Lashburn; Alvin M. Toews, Neilburg, both of Canada

[73] Assignee: Husky Oil Operations Ltd., Calgary, Canada

[21] Appl. No.: 27,607

[22] Filed: Mar. 18, 1987

[51] Int. Cl.⁴ .............................................. F16H 7/12
[52] U.S. Cl. ..................................... 474/101; 474/135
[58] Field of Search ............... 474/135, 133, 111, 109, 474/101, 113, 117, 118; 74/501.5, 501 R

[56] References Cited

U.S. PATENT DOCUMENTS 1,982,299 11/1934 Hapgood ............................. 474/135
2,743,679 5/1956 Lofton ............................ 474/135 X
3,762,229 10/1973 Johnson .......................... 474/135 X

FOREIGN PATENT DOCUMENTS 1160231 12/1963 Fed. Rep. of Germany ...... 474/135

*Primary Examiner*—Thuy M. Bui
*Attorney, Agent, or Firm*—James W. Hellwege

[57] ABSTRACT

The tightener is designed for use with belts driving oil well pumps but of course may be used in other environments. It consists of a belt idler pulley journalled for rotation upon the distal end of a mounting arm which in turn is secured for selective rotation by the other end thereof to a mounting bracket. A spring loaded actuating arm rotates the mounting arm through an arc from a belt tensioned position to a belt untensioned position and vice versa and the actuating arm may be selectively held in the belt tensioned position. An adjustment is provided between the actuating arm and the mounting arm to preset the angle therebetween and thus the relationship of the pulley with the belt. The inner end of the mounting arm and upper end of the actuating arm are mounted on a center line between the upper and lower runs of the belt so that the device can be adjusted to engage the outer surface of either of the belt runs depending upon drive direction.

3 Claims, 2 Drawing Sheets

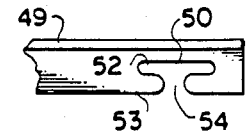
FIG.1A
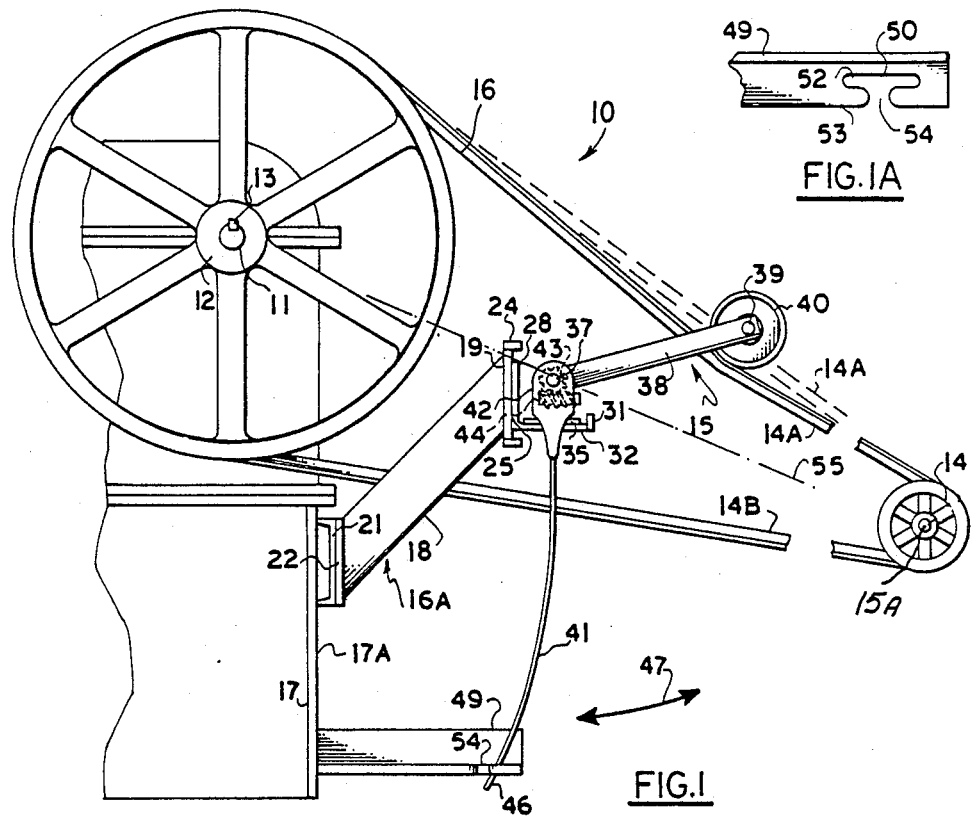
FIG.1
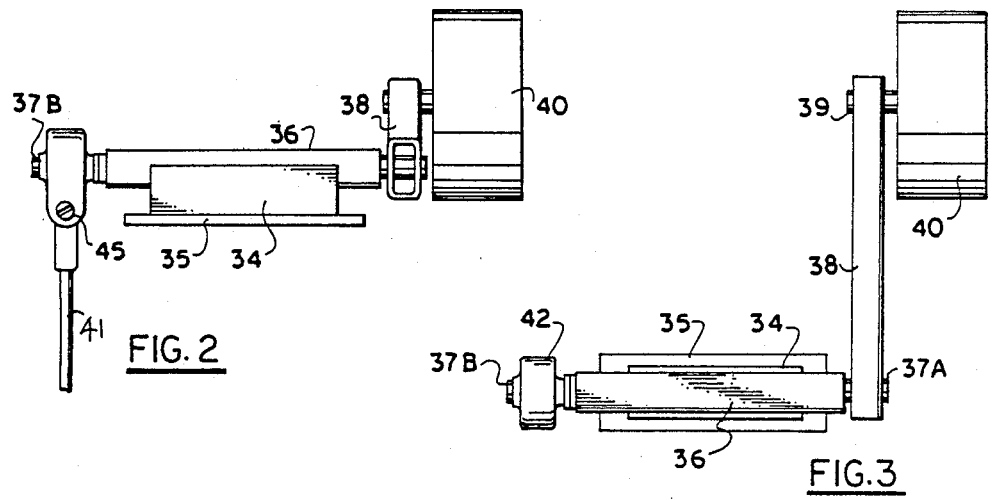
FIG.2
FIG.3

BELT TIGHTENING ASSEMBLY

BACKGROUND OF THE INVENTION

This invention relates to new and useful improvements in a belt drive device wherein the belt is tightened or loosened by means of a belt tightening assembly and although it is designed specifically for use with oil well pumps, nevertheless it will be appreciated that such a drive device may be used in other environments.

Conventionally, standard belt tightening is used but this suffers from several disadvantages when used in oil well pumping environment as the prime mover (engine) is physically shifted back and forth to adjust the belt and this is difficult to do.

SUMMARY OF THE INVENTION

The present device provides a relatively simple assembly which is fully adjustable and can be positioned on either one of the belt runs in order to accommodate reversing of the drive direction. It can maintain a predetermined tension and can accommodate wet weather or belt stretch. In addition it can act as a quick release mechanism for releasing the tension.

In accordance with the invention there is provided a belt drive device for belts extending around a drive pulley and a driven pulley with said belt having two runs therebetween, one of which is a drive run and the other a return run, said device comprising a selectively operable belt tightening and release assembly including in combination support means, a belt run engaging pulley, a pulley mounting arm, said pulley being journalled for rotation upon one end of said pulley mounting arm, the other end of said pulley mounting arm being mounted on said support means for at least selective partial rotation between a belt tensioned position and a belt untensioned position and vice versa, and actuating means operatively secured to said pulley mounting arm adjacent said other end thereof for said selective partial rotation of said pulley mounting arm.

Another advantage is to provide a device of the character herewithin described which includes a resilient mounting arm selectively engageable in the belt drive position and in which the tension of the belt engaging pulley is predetermined by presetting the angular relationship between the arm carrying the belt pulley and the actuating arm.

Another advantage of the invention is to provide a device of the character herewithin described which is simple in construction, economical in manufacture and otherise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicants and of the preferred typical embodiment of the principles of the present invention, in which:

DESCRIPTION OF THE DRAWINGS

FIG. 1 is a fragmentary partially schematic view of the driven pulley assembly of an oil well pumping unit, with the invention incorporated therewith.

FIG. 1A is a fragmentary plan view of the spring arm retainer.

FIG. 2 is a side elevation of the invention per se.

FIG. 3 is a top plan view of the invention per se.

In the drawings like characters of reference indicate corresponding parts in the different figures.

DETAILED DESCRIPTION

Figure 8:
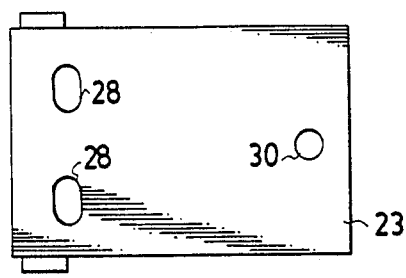
FIG. 8 is a side elevation of the upper mounting plate of FIG. 4.

Proceeding therefore to describe the invention in detail, reference should first be made to FIG. 1 in which 10 illustrates schematically, part of the drive mechanism of an oil pump assembly and including a driven shaft 11 having a driven pulley 12 secured to the shaft 11 by means of key 13.

FIG. 1 illustratres the driver pulley 14 mounted upon shaft 15A operatively connected to the prime mover (not illustrated) and an endless belt 16 extends around pulleys 12 and 14 and is normally in the slack position shown in phantom when not in the drive position shown in full line.

This belt includes a drive run 14B and a return run 14A.

The invention collectively designated 15 is mounted upon a bracket assembly collectively designated 16A which in turn is supported to supporting structure 17 forming part of the drive assembly 10.

FIGS. 4 through 11 show details of the bracket assembly 16A which includes a support member 18 preferably taking the form of hollow square tubing situated at an upwardly and outwardly inclined angle as clearly shown with the ends 19 and 20 being cut at approximately a 45° angle to the longituinal axis 21 of the member 18.

A transverse mounting plate 22 is welded across the lower end 20 and in turn is bolted to a channel member 21 by means of bolts 22A, said channel member being welded or otherwise secured to the side plate 17A of the supporting structure as clearly shown in FIG. 1. The plate 22 is shown in detail in FIG. 7 and extends beyond the sides of the mounting member 18 to permit the attachment by means of bolts 22A when assembled.

The upper mounting plate 23 is also a rectangular plate welded to the upper end 19 of the member 18 and offstanding to one side with lugs 24 being welded at one end, to the upper and lower edges thereof.

Figure 9:
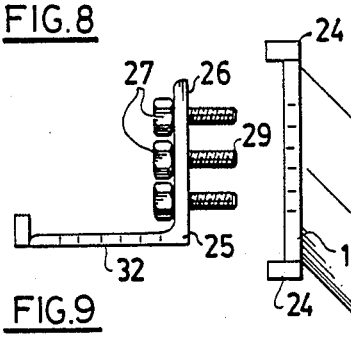
FIG. 9 is an end elevation of the support for the invention.
Figure 7:
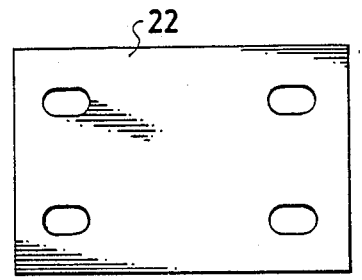
FIG. 7 is a side elevation of the lower mounting plate in FIG. 4.
Figures 4, 5:
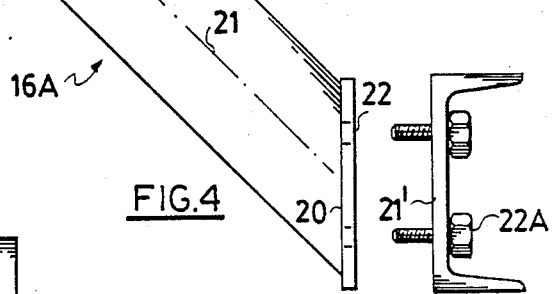
FIG. 4 is a side elevation of the support arm of the bracket assembly.
FIG. 5 is an end view of the support component to which the arm of FIG. 4 is secured.
Figure 10:
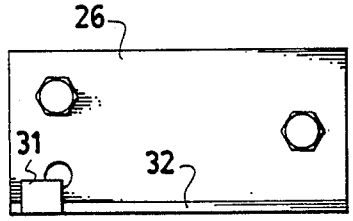
FIG. 10 is a side elevation of FIG. 9.
Figure 11:
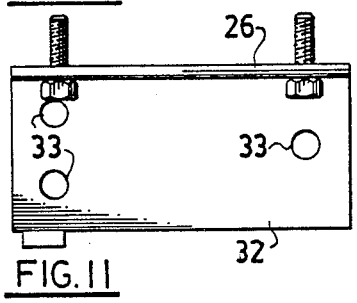
FIG. 11 is a top plan view of FIG. 9.
Figure 6:
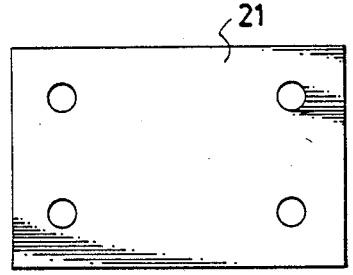
FIG. 6 is a side elevation of FIG. 5.

FIGS. 9 through 11 show the right angled cradle support 25 bolted by the vertical flange 26 thereof to the upper plate 23 by means of bolts 27 engaging apertures 28 in the plate 23 and stud 29 engaging aperture 30 in plate 23. The positioning of these bolts and stud are clearly shown in FIGS. 8 through 11.

A further lug 31 extends upwardly from one end of the outer edge of the lower flange 32 and bolt apertures 33 are formed through this lower flange as shown in FIG. 11.

A cradle 34 including base plate 35 is bolted to the lower flange 32 by means of a bolt (not illustrated)

engaging through the apertures 33 in the lower flange and a bearing and support tube 36 is secured as by welding within the cradle 34 and extends upon either side thereof.

A shaft 37 is bearingly supported within the tube 36 and a pulley mounting arm 38 is secured by one end thereof to one end 37A of this shaft as shown in FIG. 3.

A stub shaft 39 is secured within the other end of arm 38 and extends at right angles therefrom and a belt engaging pulley 40 is journalled for rotation upon this stub shaft.

An actuating arm 41 made of spring steel, extends from a small gearbox 42 downwardly with reference to FIG. 1 and forms, with the pulley mounting arm 38, a crank arm assembly, it being understood that the actuating arm 41 is operatively connected to the opposite end 37B of the shaft 37.

The gearbox 42 includes a pinion wheel 43 secured to the end 37B of shaft 37 and a worm gear 44 engageable with the pinion and selectively rotatable within the gearbox through one extending end 45 which may be slotted for a screwdriver engagement or hex-ended for a wrench engagement.

It will be understood that rotation of this worm gear presets the angular relationship between arms 41 and 38.

The lower end 46 of the resilient rod 41 is moveable in the direction of double-headed arrow 47 thus rotating shaft 37 together with the pulley mounting arm 38 and the belt engaging pulley 40, from an untensioned position whereby the run of 14A of the belt is as shown in phantom, to a tensioned position shown in solid line and vice versa.

It is desirable to provide means whereby the lower end 46 of the arm 41 is selectively maintained in the tensioned position and in this connection a right angled bracket 49 extends from the side 17 of the driven assembly. The lower flange 50, shown in phantom in FIG. 1A, is provided with an elongated slot 52 parallel with the edge 53 and an entrance aperture 54 so that the rod portion 46 may be passed through the entry and engaged within the slot 52 thus maintaining the pulley 40 in the drive position against the outer surface of the run 14A of the belt. The length of rod 41 together with the resiliency thereof, applies the necessary contact pressure between pulley 40 and the other surface of run 14A with the degree of pressure being controlled by the preset relationship between arms 41 and 38 via the gearbox 42. This provides and maintains a predetermined tension on the belt despite wet weather or belt stretch. It also provides a quick release mechanism.

An important feature to be noted is that the pivot axis of shaft 37 lies on or near the centre line 55 extending between the pivot axes of the pulley shafts 11 and 15 so that by adjusting the relationship of arms 41 and 38 by the gearbox 42, the belt engaging pulley may engage the outer surface of the run 14A or the outer surface of the run 14B, that is the return run of the belt depending upon the direction of rotation of the drive shaft 15.

When turned to apply pressure to the belt run 14B, the spring 41 is bowed in the opposite direction and engages the opposed end of the slot 52.

Since various modifications can be made in our invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A belt drive device for belts extending around a drive pulley and a driven pulley with said belt having two runs therebetween, one of which is a drive run and the other a return run, said device comprising a selectively operable belt tightening and release assembly including in combination a belt tightener and belt release support means, a shaft journalled on said support means having first and second ends, a belt run engaging pulley, a pulley mounting arm, said belt run engaging pulley being journalled for rotation upon one end of said pulley mounting arm, the other end of said pulley mounting arm being mounted on said first end of the shaft journalled on said support means, manual actuating means operatively secured to the second end of the shaft journalled on said support means for quick release of said pulley from said belt, and means to preset the angular relationship between said actuating means and said pulley mounting arm comprising a worm and pinion gear assembly operatively connected to said actuating means and said pulley mounting arm and further means to rotate said worm gear selectively thereby rotating one of said actuating means and said pulley mounting arm relative to the other.

2. The belt drive device according to claim 1 in which said actuating means takes the form of a spring arm operatively secured by one end thereof to said shaft.

3. The belt drive device according to claim 1 in which the pivot axis of said shaft lies adjacent the center line extending between the rotation axis of said drive pulley and the rotation axis of said driven pulley whereby said belt run engaging pulley may selectively engage said belt during either its drive run or its return run.

* * * * *